March 28, 1967  R. K. CAMPBELL  3,311,319
CHALK LINE REEL
Filed April 8, 1965  2 Sheets-Sheet 1
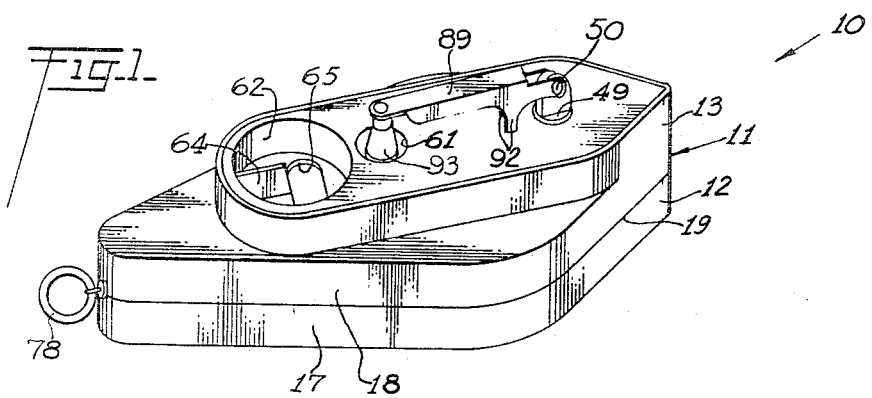
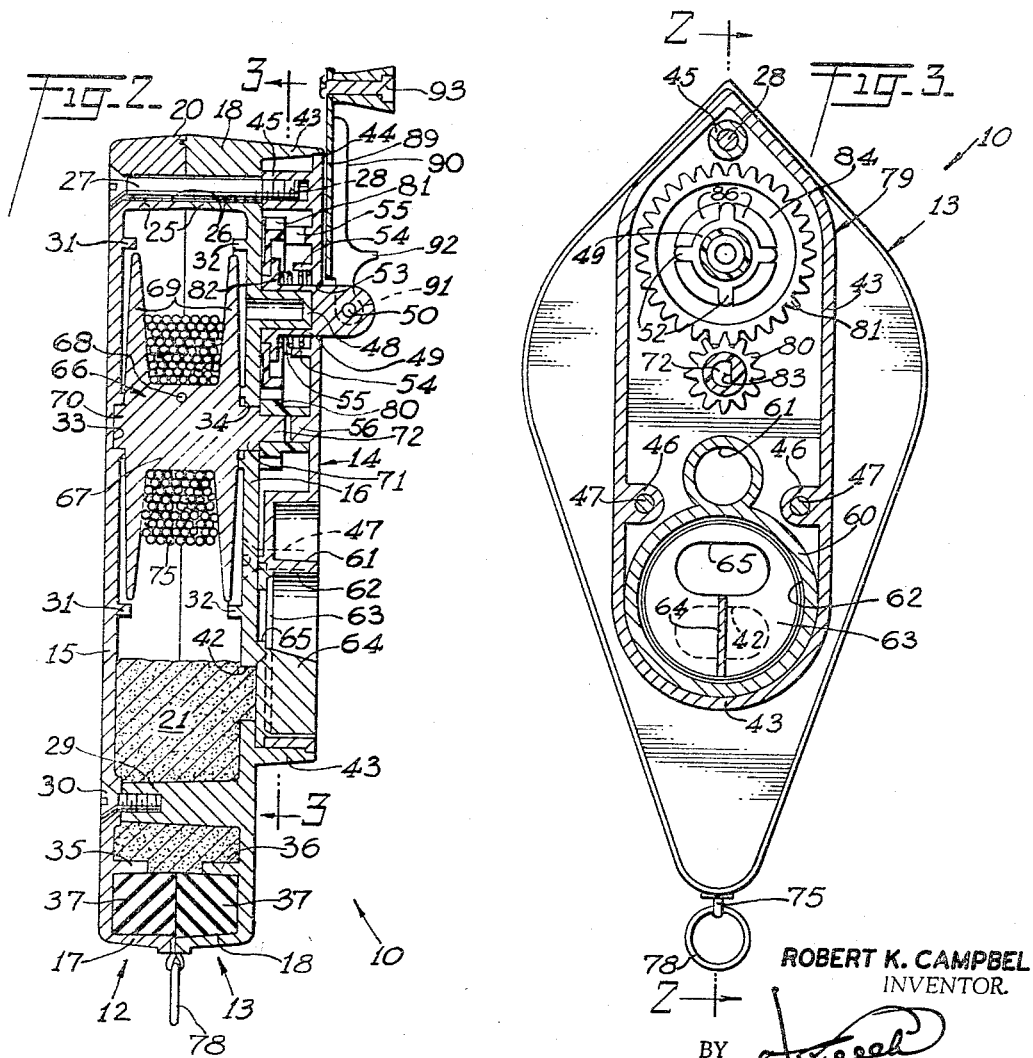
ROBERT K. CAMPBELL,
INVENTOR.
BY
ATTORNEY.

March 28, 1967 R. K. CAMPBELL 3,311,319
CHALK LINE REEL
Filed April 8, 1965 2 Sheets-Sheet 2
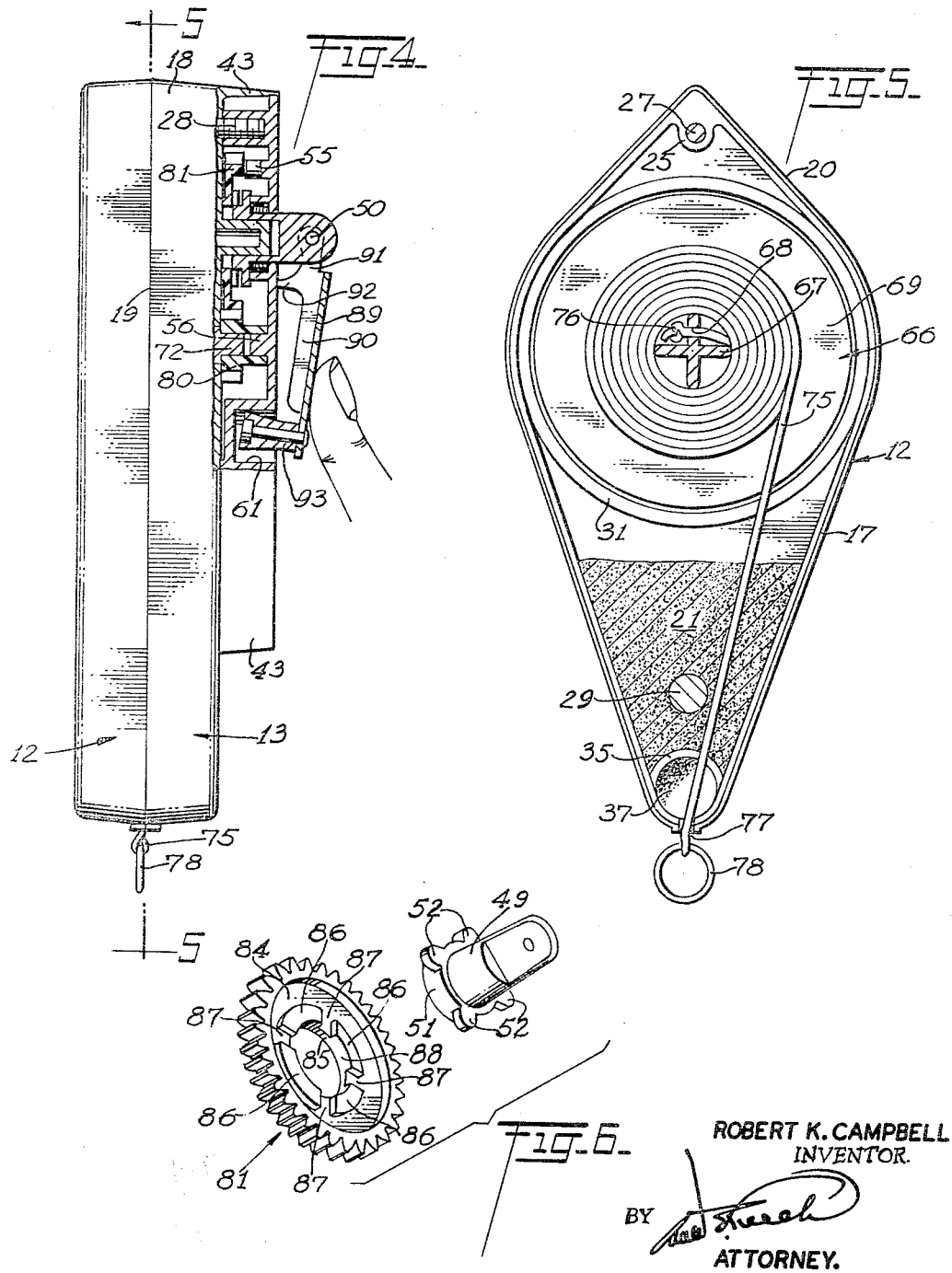
ROBERT K. CAMPBELL,
INVENTOR.
BY
ATTORNEY.

United States Patent Office 3,311,319
Patented Mar. 28, 1967

3,311,319
CHALK LINE REEL
Robert K. Campbell, Costa Mesa, Calif., assignor to R. K. Campbell Enterprises, Inc., a corporation of California
Filed Apr. 8, 1965, Ser. No. 446,653
4 Claims. (Cl. 242—100)

This invention relates to chalk line reels and particularly to such a reel which is also adapted to be used as a plumb bob.

Such reels commonly include a box enclosing both the reel and a body of powdered chalk with which the line is impregnated as it is payed out from the box through a hole therein. A crank is provided outside the box for rotating the reel to wind up the line. The line passes through a pair of wipers as it leaves (or re-enters) said box, to prevent an excessive loss of chalk when the line is payed out for use. The box is symmetrically shaped to form a pointed plumb bob when the crank is locked and the box suspended on the line.

It is an object of the present invention to provide a novel and improved chalk line reel of the type above described, wherein the line may be reeled in rapidly by the crank being equipped with gears and the latter isolated from the chalk and therefore free from wear from that source.

Another object is to provide such a reel wherein the crank has three positions, in one of which it is free to rotate the reel inside the box, and in another of which it locks the reel against rotation, and in the third of which, it releases the reel to rotate without rotating the crank, thereby allowing the line to be readily payed out from the box.

A further object is to provide such a reel, the box of which is comprised principally of only three simple die-cast parts.

The manner of accomplishing the foregoing objects as well as further objects and advantages will be made manifest in the following description, taken in connection with the accompanying drawings, in which:

FIG. 1 is a perspective view of a preferred embodiment of the invention with the line entirely wound up on the spool of the reel and with the crank means folded into non-rotatable interlocking engagement with the box of the reel.

FIG. 2 is a longitudinal sectional view taken on the line 2—2 in FIG. 3 and illustrates the crank of the invention unfolded for use in manually rotating the spool of the reel.

FIG. 3 is a longitudinal sectional view of the invention taken on the line 3—3 of FIG. 2.

FIG. 4 is a side elevational view of the invention with a portion of the gear housing of the invention shown in section to illustrate the manual depression of the crank handle of the invention to open the clutch means thereof and thus permit the free rotation of the spool within the box of the reel without corresponding rotation of the spool actuating crank, this permitting ready withdrawal of the line from the reel box so long as the crank handle is depressed as shown in this view.

FIG. 5 is a longitudinal sectional view taken on the line 5—5 of FIG. 4 and illustrates how the chalk line is wound on the spool of the invention and passes through a body of powdered chalk confined in the box thereof, and outwardly through a hole in the box after passing between a pair of novel rubber wipers of the invention which removes the excess chalk from adherence to the line.

FIG. 6 is an exploded perspective view of the two mating clutch elements of the clutch means of the invention, one such means being on the gear wheel and the other being on the crank shaft.

Referring specifically to the drawings, the invention is there shown as embodied in a chalk line reel 10 having a box 11 which is comprised principally of three die castings including a box bottom 12, a box top 13 and a gear housing cover 14. As seen in FIG. 3, the box 11 has a tear drop outline when viewed from above and the box bottom and the box top have bottom and top walls 15 and 16 respectively, which conform to this tear drop shape and are provided at their edges with side walls 17 and 18 which meet in a medial plane 19 with a rabbetted connection 20 to prevent the escape of powdered chalk 21, a quantity of which is enclosed within the box 11.

The bottom wall 15 and top wall 16 have bosses 25 which have aligned bores 26 for receiving a screw 27, a threaded end 28 of screw 27 extending upwardly from top wall 16 for a purpose to be described hereinafter. A boss 29 formed on top wall 16 has a tapped hole for receiving a screw 30 so as to hold the bottom wall 15 snugly against boss 29. Annular bosses 31 and 32 are formed co-axially on the bottom wall 15 and top wall 16 respectively and spool trunnion bearing bores 33 and 34 are formed in said walls concentric with said bosses. Formed in box bottom 12 and box top 13, in the pointed end of box 11 adjacent boss 29, are a pair of wiper holding cups 35 and 36 within which a pair of approximately cylindrical soft rubber wipers 37 are mounted.

Top wall 16 has a powdered chalk receiving hole 42 and a gear housing side wall 43 extends upwardly from top wall 16 to make a rabbetted connection 44 with the perimeter of the gear box cover 14. This cover is flat and has a hollow tapped boss 45 into which threaded end 28 of screw 27 is screwed, and it also has bosses 46 formed inwardly from side wall 43 which bosses are apertured and tapped to receive screws 47 which extend upwardly through suitable holes in top wall 16.

Top wall 16 also has a hollow cylindrical stud 48 extending upwardly therefrom this stud comprising a pivotal mounting for a hollow crank shaft 49, the upper end of which is flattened and provided with a crank pin 50, and the lower end of which has an annular bearing shoulder 51 from an upper portion of which four clutch studs 52 extend radially.

The hollow crank shaft 49 extends upwardly through a hole 53 formed in the gear housing cover 14, concentrically with stud 48. Also provided on gear housing cover 14 and extending downwardly therefrom concentrically with hole 53 is an annular boss 54. Also formed downwardly on gear housing cover 14 at the same radius from the axis of hole 53 and equally spaced thereabout are three gear positioning posts 55. Formed downwardly from gear housing cover 14 concentrically with trunnion bore 34 is a gear pinion pivot boss 56. Cover 14 also has formed downwardly therefrom a figure-8 shaped wall 60 forming a blind well 61 and a larger bottomless well 62. The portion of wall 60 forming the bottomless well 62 fits sngly within one end portion of the gear housing side wall 43 and is spaced a slight distance upwardly from the top wall 16 of the box top 13 so as to accommodate, therebeneath, a circular plastic chalk valve 63 having a finger pin 64 for actuating the same and an aperture 65 which can be moved into and out of registry with chalk receiving hole 42 by manipulation of the valve 63.

Mounted in the box 11 concentrically with the annular bosses 31 and 32 and the trunnion bores 33 and 34 is a line spool 66. This spool is preferably die cast to include a central cruciform winding staff 67 having a line retaining hole 68, this staff axially connecting spool heads 69 from which trunnions 70 and 71 extend axially in opposite directions. Trunnion 70 journals in trunnion bore 33 and trunnion 71 journals in bore 34 and has an axial extension 72 which is cylindrical excepting for its having one side thereof flattened. A small annular recess is formed in top wall 16 about the inner end of bore 34 to receive a felt washer 73, or an O-ring as desired, for confining lubricant in the bearing provided by bore 34 for spool trunnion 71.

A suitable twisted line 75 is inserted through hole 68 in the winding staff 67 and a knot 76 tied therein. Said line is then placed between wipers 37 to extend outwardly from box 11 through a hole therein formed in the medial plane 19 by recesses 77 provided on the longitudinal axis of reel 10 adjacent the wipers 37 in the juxtaposed edges of bottom wall 15 and top wall 16. The outer end of line 75 is preferably tied to a ring 78.

The gear housing cover 14 co-operates with the box top 13 to form a gear housing 79 in which a gear pinion 80 and a gear 81 and a coil spring 82 are confined in proper operative relation by the assembly of the gear housing cover 14 on the box top 13. The gear pinion 80 has a bore 83 with a flat side at one end thereof which nonrotatably fits the axial trunnion extension 72, and a cylindrical bore at the opposite end thereof which freely rotatably fits the gear pinion pivot boss 56. Gear 81 has a flat radial web 84 having an axial bore 85, upper edge portions of which are built up to form circumferentially spaced flat bosses 86 separated by notches 87. The arcuate inner faces 88 of the bosses 86 constitute an outward extension of the axial bore 85 of the gear 81 and this bore slidably and rotatably receives the annular bearing shoulder 51 of the hollow crank shaft 49, while the four clutch studs 52 are dimensioned and spaced so as to slide axially into the notches 87 of the gear 81 when disposed opposite said notches. The coil spring 82 is confined within and held in place by the annular boss 54 so as to constantly spring bias the hollow crank shaft 49 towards the gear 81 with the annular bearing shoulder 51 always inserted within the bore 85 of gear 81.

Pivotally mounted on the crank pin 50 provided on the flattened outer end of hollow crank shaft 49 is a crank 89 comprising a sheet metal channel, side flanges 90 of which provide extending ears 91 which pivotally receive crank pin 50 and fulcrum fingers 92, the function of which will be made clear hereinafter. The crank 89 is provided with a handle at its outer extremity which extends therefrom in the same direction as the fingers 92.

It is to be noted, in FIG. 2, that when the crank 89 is in the full line position in which it is shown in that view, the spring 82 is pressing the crank shaft 49 towards the gear 81, so that when said shaft is rotated by turning the crank 89, the clutch studs 52 are either retained by spring 82 in the notches 87, if already there, or they are caused to snap into said notches as soon as said studs come opposite the latter. Thus, rotation of shaft 49 by turning the crank 89 while in its full line position as shown in FIG. 2 causes rotation of the gear 81 which is transmitted to the gear pinion 80 and through this to the line spool 66 thereby winding the line 75 onto said spool as shown in FIGS. 2 and 5.

Operation

The crank 89 has a second position relative to shaft 49 which is produced by rotating the crank 180° about the crank pin 50 and doing this when the crank handle 93 is located opposite blind well 61 formed in the gear housing cover 14 so as to be inserted therein as shown in FIG. 1. This locks the line spool 66 against rotation and is serviceable in rendering the line reel 10 available for use as a plumb bob, after any desired length of line has been payed out therefrom.

Whenever the chalk line reel 10 is held in the hand with the crank 89 positioned as shown in FIG. 1, the spool 66 may be released from its locked condition above described, merely by depressing the crank 89 as shown in FIG. 4, which operates through contact of the fulcrum fingers 92 with the gear housing cover 14, to pull the hollow crank shaft 49 outwardly through hole 53 in said cover and thus withdraw the clutch studs 52 from notches 87 on the gear 81, as shown in this view. It is to be noted that the annular boss 54 provides a stop limiting this outward movement of the crank shaft 49 so as to retain the annular bearing shoulder 51 inserted into the bore 85 provided in gear 81 so that said gear is always rotatably related with the shoulder 51. It is also pointed out that the three gear-positioning posts 55, formed inwardly from the gear housing cover 14, confine the gear 81 in closely juxtaposed relation with the top wall 16 of the box 11 so that whenever the crank 89 is depressed as shown in FIG. 4 the clutch formed by the studs 52 and notches 87 is disengaged.

From the foregoing description it is believed manifest that the present invention provides a novel chalk line reel which is highly practical and may be economically manufactured and marketed at a reasonable price and which fulfills all of the objectives set forth therefor in the preamble to this specification.

While only a single preferred embodiment of the invention is disclosed herein, it is to be understood that this is for illustrative purposes only, and that various changes and modifications may be made in the disclosed embodiment without departing from the spirit of the invention or the scope of the appended claims.

The claims are:

1. In a chalk line reel, the combination of: a line reeling spool; a box confining said spool, providing bearings therefor and confining a body of powdered chalk, there being an aperture in said box through which a line may be payed out as it is unwound from said spool; external crank means for rotating said spool to wind up said line on said spool; means for locking said crank means against rotation to prevent said line being payed out; and clutch means connecting said crank means to said spool and optionally operable while said crank means is locked against rotation to temporarily disconnect said spool from said crank means to free said spool for rotation for the rapid paying out of said line, without causing said crank means to rotate.

2. A chalk line reel as recited in claim 1 wherein said crank means includes a crank shaft with a crank having a crank handle and pivotally mounted on said shaft on a transverse axis, to swing into one position in which said handle is turned outwardly for manually gripping the same to rotate said crank, said crank being adapted to swing on said axis into an opposite position with said handle turned inwardly to interlock with said box to prevent rotation of said crank and said spool, said spool disconnecting clutch means being actuated by manually depressing said crank handle when handle is in interlocked relation with said box as aforesaid.

3. A chalk line reel as recited in claim 2 wherein spring clutch means are provided between said crank means and said spool, said clutch means being normally spring biased into engagement; and means actuated by depression of said crank handle as aforesaid, to disengage said clutch, said clutch means automatically reengaging upon relaxation of the pressure depressing said crank handle.

4. A chalk line reel as recited in claim 3, wherein said spool has a stub-shaft extending outwardly through a wall of said box; a gear pinion mounted on the extending end of said stub shaft; a gear rotatably mounted on said box in co-planar meshing relation with said pinion and in co-axial relation with said crank shaft; and wherein said clutch means includes mating clutching surfaces on said gear and on said crank shaft, and expansion spring means constantly urging said surfaces into clutching engagement; and fulcrum means providing a fulcrum for said crank on said box whereby manual depression of said crank handle as aforesaid separates said clutching surfaces and disengages said clutch means.

References Cited by the Examiner

UNITED STATES PATENTS

| | | | |
|---|---|---|---|
| 1,768,078 | 6/1930 | Krause et al. | 242—100 |
| 2,589,500 | 3/1952 | London et al. | 242—84.8 X |
| 3,044,731 | 7/1962 | Zelnick | 242—84.8 |

FRANK J. COHEN, *Primary Examiner.*

N. L. MINTZ, *Assistant Examiner.*